Patented Nov. 26, 1935

2,021,901

UNITED STATES PATENT OFFICE 2,021,901

CELLULOSIC COMPOSITION OF MATTER CONTAINING AN ALKYL PHOSPHATE

Henry B. Smith, Rochester, N. Y., assignor to Eastman Kodak Company, Rochester, N. Y., a corporation of New York No Drawing. Application December 11, 1930, Serial No. 501,667

8 Claims. (Cl. 106—40)

This invention relates to compositions of matter in which a cellulose organic derivative, such as cellulose acetate, propionate, butyrate or the like is combined or mixed with other substances, such as a compatible plasticizer, and a common solvent for both, with or without other useful addition agents, so that the resulting product will have properties such as will make the composition highly advantageous for use in the plastic and analogous arts, such, for instance, as the manufacture of wrapping sheets, photographic film, artificial silk or leather, varnishes or lacquers and the like.

One object of this invention is to produce a composition of matter which may be made into permanently transparent, strong and flexible sheets or films of desired thinness which are substantially waterproof, are unaffected by ordinary protographic fluids and possess the desired properties of a support for sensitive photographic coatings. Another object of my invention is to produce a composition which is capable of easy and convenient manipulation in the plastic and analogous arts, such as in the manufacture of sheets, films, artificial silk filaments, artificial leather, varnishes, lacquers and the like, and to produce a composition which will not injure, or be injured by, the substances or surfaces with which it is associated during manufacture.

Other objects will become apparent to those skilled in the art to which this invention pertains.

While cellulose derivatives have been known for decades it has also been known that to utilize them in various plastic arts it is necessary to mix therewith such plasticizing or conditioning agents as camphor, castor oil, monochlornaphthalene or the like. Certain of these and other addition agents are also added for the purpose of reducing the inflammability of the product. Plastic inducing agents, such as the higher alcohols and their esters, are sometimes also added. Similarly, addition compounds of various kinds have been employed to increase flexibility, transparency, toughness and other properties which will enhance the value of the resulting product. Addition products for the same or similar purposes are also added to cellulose derivatives to prepare them for use in the other plastic arts, such as in the manufacture of lacquers, varnishes, artificial silk filaments, artificial leather, moulded compounds and the like. While the plasticizers or other addition agents heretofore discovered have had their utility in the art, the increasing use to which cellulose derivatives, and particularly the cellulose organic derivatives, have been put and the increasing number of desirable properties required of the cellulose derivative for most purposes has made the discovery of new and economical plasticizers or other addition agents therefor a matter of considerable importance to the art.

I have discovered that valuable properties may be induced in and/or contributed to compositions containing cellulose organic derivatives, such as cellulose acetate, cellulose propionate, cellulose butyrate, or the like, by adding thereto as a plasticizer one of the lower alkyl phosphates, such for instance as triethyl, tripropyl or tributyl phosphate, together with a solvent, such as acetone, which will dissolve both the cellulose derivative and plasticizer. These plasticizers are esters of a lower fatty alcohol and phosphoric acid. They are compatible with cellulose organic derivatives and particularly compatible with cellulose acetate in the percentages hereinafter given. They are not expensive compounds and not particularly difficult to produce, or obtain upon the open market. The particularly useful properties which any of them induces in or contributes to a cellulosic composition containing it are hereinafter enumerated.

In order that those skilled in this art may better understand my invention I would state, by way of illustration, that for the manufacture of photographic film base or other similar sheets my new composition of matter may be compounded as follows: 100 parts of a cellulose organic derivative such as acetone soluble cellulose acetate i. e. cellulose acetate containing from 38% to 42% acetyl radical, approximately, is dissolved with stirring at atmospheric temperature in 300 to 500 parts, preferably 400 parts, by weight, of acetone. To this solution may be added from 10 to 50 parts by weight, of a lower alkyl prosphate, such for instance as tributyl phosphate, it being found preferable to employ approximately 30 to 50 parts thereof for such sheets. For the production of photographic film base or the like, the amount of plasticizer may be decreased or increased within the limits stated, depending upon whether it is desired to decrease or increase, respectively, the properties which this plasticizer contributes to the finished product. The amount of solvent employed may also be decreased or increased, depending upon whether it is desired to have a more or less freely flowing composition, respectively.

A composition of matter prepared as above described may be deposited upon any suitable film forming surface to form a film or sheet, as is well known to those skilled in the art. A film so produced has permanently brilliant transparency and low inflammability, burning no more readily than ordinary newsprint; films or sheets produced in accordance with my invention are also exceedingly tough and flexible. For instance, films of cellulose acetate plasticized with 10 to 50% (parts by weight based on the acetate) of tributyl phosphate had an initial flexibility of 2 to 8 times that of film containing no plasticizer. Furthermore, film so plasticized maintains flexibility for a long time, even at temperatures approaching 100° C. I have for instance found that flexibility continues at 65° C. for more than 107 days for film containing 30 to 50% of tributyl phosphate, whereas an unplasticized film became brittle in less than 30 days all of which demonstrates that a film so plasticized will withstand ordinary usage satisfactorily for many years. The sum total of the above advantageous properties of a product produced from my new composition is considerably in excess of that of products produced with what have previously been regarded as good plasticizers and in excess of the aryl phosphates so well known in the art.

I have also discovered that the lower alkyl phosphates such as tributyl phosphate, may be incorporated with cellulose organic derivatives in much larger percentages which is rather unusual as the greater majority of plasticizers are not compatible in percentages much above 50%. For instance, I have found that it is possible to incorporate with 100 parts of cellulose acetate as much as approximately 100 parts (or in other words approximately 100%) of a tributyl phosphate. This novel composition of matter is produced by merely mixing the plasticizer tributyl phosphate with cellulose acetate and then adding sufficient of a common solvent, such as acetone (assuming acetone-soluble cellulose acetate is employed), whereupon an intimate mixture of the plasticizer with the cellulose acetate results. The amount of acetone or other common solvent to be employed varies, of course, within rather wide limits depending upon the fluidity of the composition desired. 100 parts of acetone will suffice for many purposes. Various high boilers or evaporation retardents, such as ethyl lactate, amyl acetate or the like may also be added if desired, as is well known in this art.

The composition of matter so produced may then be coated into sheets in the same way that photographic film base is produced by depositing it upon plates or rolls and permitting the solvent to evaporate. Sheets so produced and having a thickness of approximately 4 or 5 thousandths of an inch were found to withstand as many as 50 folds as compared to only 2 to 3 folds with a similar sheet to which no plasticizer had been added, the determination of the number of folds being made upon the modified Schopper folding machine widely used in paper testing technology. Thinner sheets would withstand even more folds. If my novel composition is to be employed in the manufacture of artificial leather, it may be coated upon, for instance, a cloth support and the solvent permitted to evaporate or the cloth support may be caused to pass through the cellulose acetate-plasticizer composition and permitted to absorb the solution, the solvent in the coating being then permitted to evaporate. In either case, the solvent may, of course, be recovered if desired by condensing the vapors etc.

Other similar solvents (instead of acetone) which are compatible with the cellulose organic derivatives and my new plasticizer may also occur to those skilled in this art. In like manner this plasticizer may be compounded with other single organic esters of cellulose, such as cellulose propionate, butyrate and the like, or with mixed organic and/or inorganic esters, such as cellulose aceto-stearate, aceto-malate, or cellulose nitro-acetate, a suitable solvent which will dissolve both the cellulosic derivative and the plasticizer being employed.

Inasmuch as my above described composition of matter is quite useful in the production of films, sheets and coatings it will be apparent that my new plasticizers may also be employed with advantage in the other branches of the plastic art. For instance, my above described composition of matter may be employed in the manufacture of artificial silk by the dry spinning method. With the proper coagulating bath it may also be employed for wet spinning. It may be desired to employ a composition of different viscosity or evaporation characteristics, but this is a mere matter of changing the solvent proportion or adding evaporation retardents or other high or intermediate boiling constituents, as has been well known in the art for more than a decade.

My novel plasticizers may also be employed with advantage in connection with a number of the known lacquer and varnish formulæ with which they may be found to be compatible. In such cases the plasticizer is usually first put into solution with the cellulose derivative solution and if non-solvents are added for the purpose of cheapening the composition they are added only to such an extent as will not precipitate the derivative from solution. Also the plasticizer is usually employed in amounts from 50 to 60 parts, in compounding lacquers. Other uses within the scope of my invention will also suggest themselves to those skilled in the art and are to be included within the scope of the claims appended hereto.

What I claim as my invention, and desire to be secured by Letters Patent of the United States, is:

1. A composition of matter comprising a cellulose organic acid derivative and tributyl phosphate as a plasticizer for the cellulose organic acid derivative.

2. A composition of matter comprising 100 parts of an organic acid derivative of cellulose and approximately 10 to 50 parts, by weight, of tributyl phosphate as a plasticizer for the organic acid derivative of cellulose.

3. A transparent, flexible sheet comprising an organic acid derivative of cellulose and approximately 10 to 50 parts, by weight, of tributyl phosphate as a plasticizer for the organic acid derivative of cellulose.

4. A composition of matter comprising cellulose acetate and tributyl phosphate as a plasticizer for the cellulose acetate.

5. A composition of matter comprising 100 parts cellulose acetate and from about 10 to 50 parts, by weight, of tributyl phosphate as a plasticizer for the cellulose acetate.

6. A composition of matter comprising 100 parts of cellulose acetate and approximately 30 to 50 parts, by weight, of tributyl phosphate as a plasticizer for the cellulose acetate.

7. A composition of matter comprising 100 parts of cellulose acetate and approximately 30 parts, by weight, of tributyl phosphate as a plasticizer for the cellulose acetate.

8. A transparent, flexible sheet comprising cellulose acetate and approximately 10 to 50 parts, by weight, of tributyl phosphate as a plasticizer for the cellulose acetate.

HENRY B. SMITH.